CONTROLLED ENERGIZING CIRCUIT FOR ELECTRIC TREATERS
PROVIDING A PULSE OUTPUT WITH CONTROLLED
POLARITY, DELAY AND TIMING
Filed Oct. 5, 1967 2 Sheets-Sheet 1
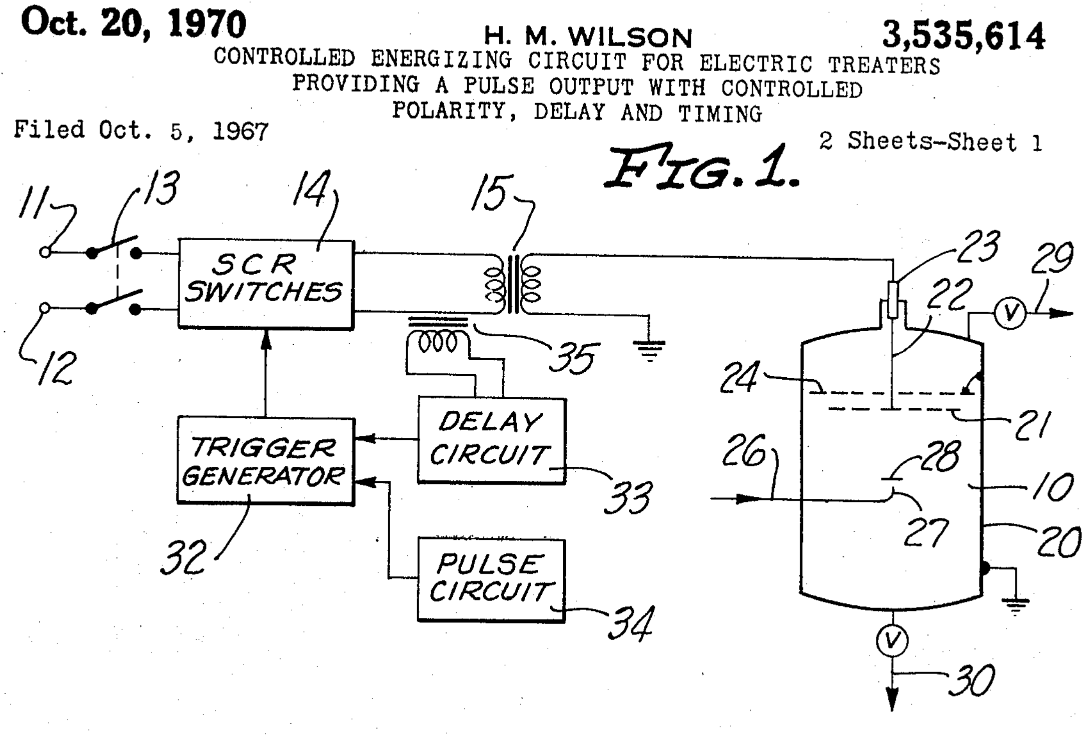
FIG. 1.
FIG. 3.
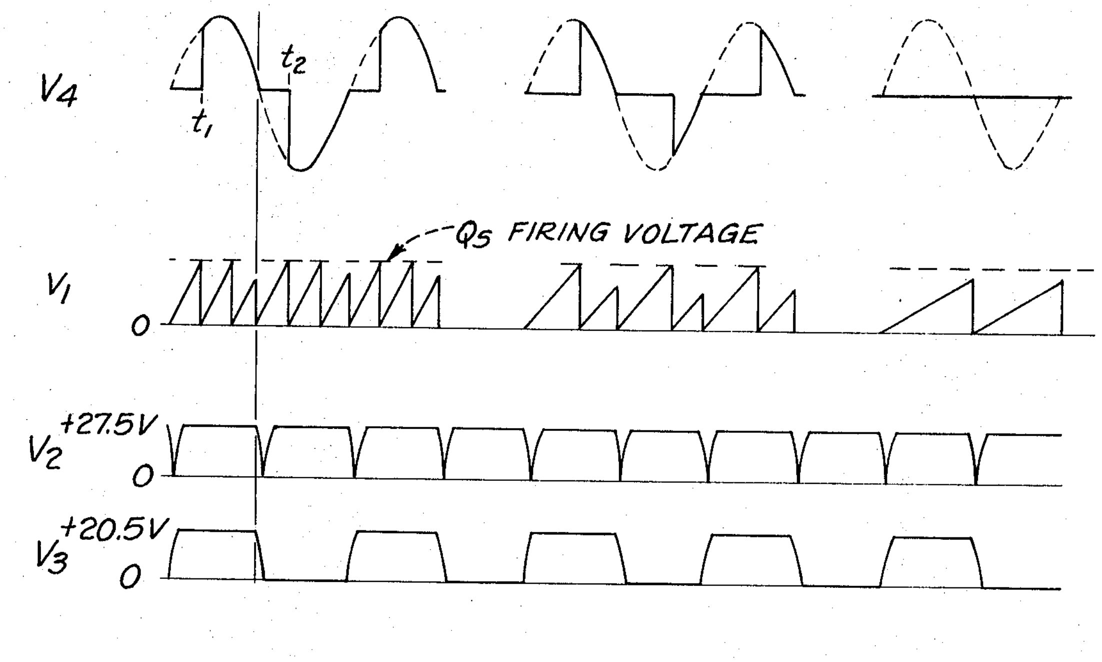
INVENTOR
HOMER M. WILSON
BY HIS ATTORNEYS
HARRIS, KIECH, RUSSELL & KERN CONTROLLED ENERGIZING CIRCUIT FOR ELECTRIC TREATERS PROVIDING A PULSE OUTPUT WITH CONTROLLED POLARITY, DELAY AND TIMING Filed Oct. 5, 1967 2 Sheets-Sheet 2

INVENTOR
HOMER M. WILSON
BY HIS ATTORNEYS
HARRIS, KIECH, RUSSELL & KERN

United States Patent Office
3,535,614
Patented Oct. 20, 1970

1

3,535,614

CONTROLLED ENERGIZING CIRCUIT FOR ELECTRIC TREATERS PROVIDING A PULSE OUTPUT WITH CONTROLLED POLARITY, DELAY AND TIMING

Homer M. Wilson, Houston, Tex., assignor to Petrolite Corporation, St. Louis, Mo., a corporation of Delaware Filed Oct. 5, 1967, Ser. No. 673,083
Int. Cl. G05f *1/20*
U.S. Cl. 323—22 18 Claims

ABSTRACT OF THE DISCLOSURE

An electric emulsion treater and a control system for supplying AC power to the treater. A full wave controlled rectifier in the AC supply which turns off at each zero crossing, a circuit for triggering a rectifier into conduction, a circuit for delaying triggering a predetermined time after zero crossing, a circuit for varying the delay manually and as a function of load current, a circuit for balancing out the DC component of the load current, and a circuit for periodically blocking triggering for a number of cycles.

This invention relates to a control system for supplying AC power to loads such as electric treaters and the like. Emulsions or dispersions are conventionally resolved by a high voltage alternating current or direct current electric field established between electrodes bridged by the dispersion. If the voltage is of sufficient magnitude it will coalesce or agglomerate the dispersed particles into masses of sufficient size to gravitate from the fluid under treatment. In direct current fields, some of the dispersed particles may precipitate on one or both of the electrodes. The power and kva demand required to effect electrical treatment, e.g. coalescence or precipitation, is a function of the instantaneous applied gradient, the resistance of the material being treated, the geometrical configuration of the electrodes and the interelectrode spaces, and the duty cycle or form factor of the applied voltage or gradient. During the operation of treater, the impedance and other characteristics of the load will vary due to changes in composition of the material being treated or lining up of the dispersed particles and to other factors such as temperature, pressure, rate of flow, and the like.

It is an object of the present invention to provide a new and improved control system for supplying electric power to such a treater or other load.

It is desirable to have treaters operate continuously and it is desirable to have provisions for manual and automatic control of the operation so that operating personnel can change the mode of operation as circumstances indicate, and so that changes in operation can be made automatically. Accordingly, it is an object of the present invention to provide a new and improved control system which permits continuous operation with AC power, intermittent operation with full wave AC power, and operation with part wave or delayed AC power.

A further object is to provide such a control system in which the parameters can be adjusted to provide desired operating values and in which the different modes can be utilized separately or concurrently. A further object is to provide such a control system providing for load limiting to prevent overloading of any portion of the system.

In general, the control system of the invention provides for continuous operation with full wave AC power, provides for pulsing operation with full wave AC power for a number of cycles and no power for a number of cycles, and provides for a delay operation wherein power is disconnected at each zero crossing time of the source and

2 the reapplication is delayed a specific portion of the half cycle.

It is an object of the invention to provide new and improved circuitry for accomplishing such control operation. A further object is to provide new and improved circuitry permitting selective operation in the various modes. An additional object is to provide such circuitry incorporating means for varying the timing parameters of the operating modes. It is another object of the invention to provide such control circuitry including means for limiting power turn-on and power turn-off to a specific one of the two zero crossing times so that "on" times and "off" times will be multiples of full cycles. This operating arrangement prevents transformer core saturation which may result from indiscriminate switching timing. A further object is to incorporate means for balancing out the DC component of the load current by varying the turn-on time for one half cycle relative to the other half cycle.

Other objects, advantages, features and results will more fully appear in the course of the following description. The drawings merely show and the description merely describes a preferred embodiment of the present invention which is given by way of illustration or example.

In the drawings:

FIG. 1 is a diagram illustrating a preferred form of the apparatus of the invention;

FIG. 3 comprises voltage wave forms illustrating the operation of the circuit of FIG. 2.

Figure 2:
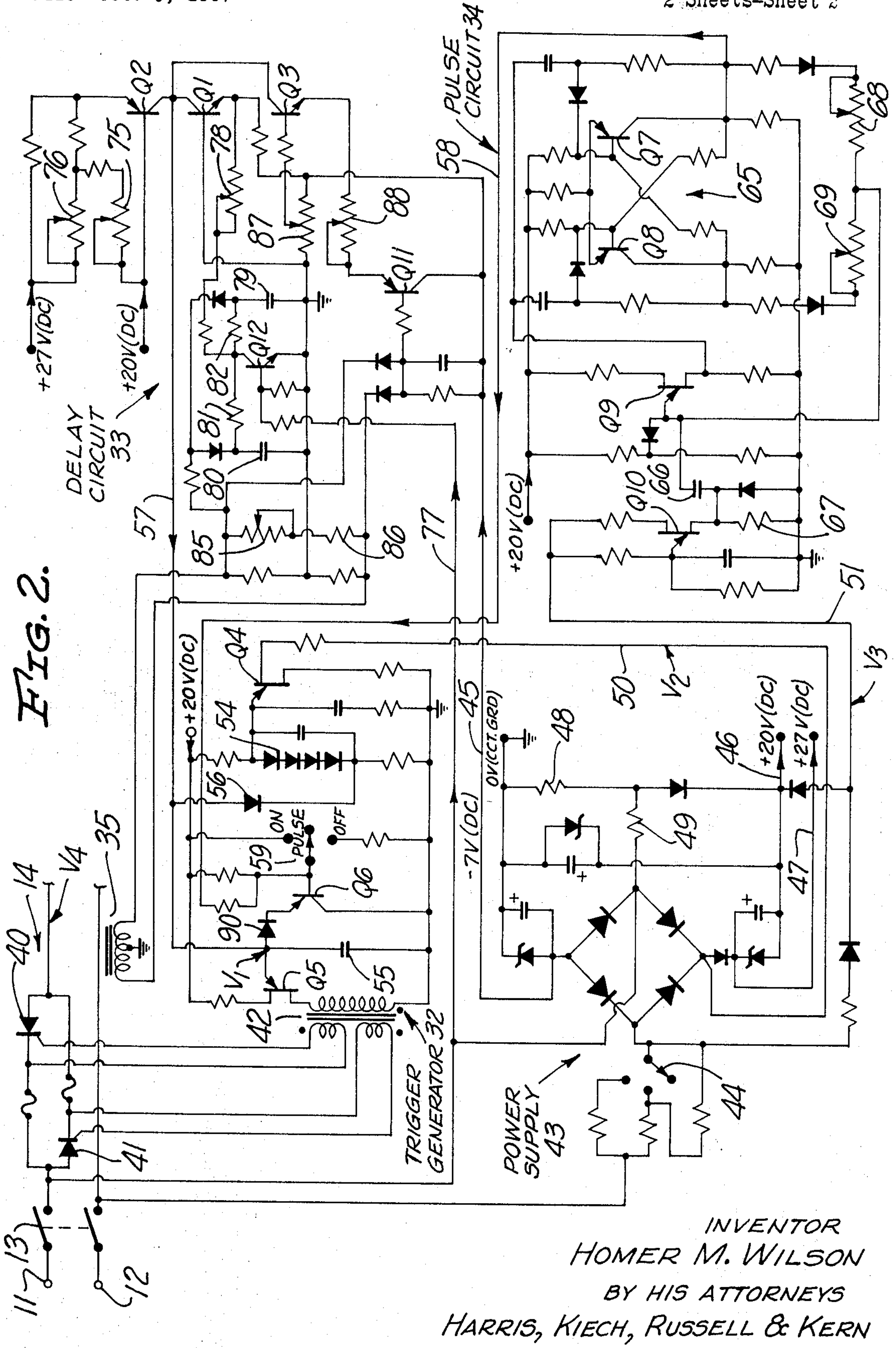
FIG. 2 is an electrical schematic of a preferred form of the control circuit.

Referring to FIG. 1, an electric treater 10 is energized from an AC power source connected to line terminals 11, 12, through an on/off switch 13, a set of switches or switch unit 14, and a voltage step-up transformer 15. The construction of the treater itself is not critical to the invention and any conventional emulsion breaking electric treater may be utilized. A typical treater is illustrated incorporating an upright cylindrical container 20 closed at both ends. A set of foraminous electrodes is disposed in a horizontal pattern within the container, including an electrode 21 connected to the secondary of transformer 15 via a conductor 22 and a feed-through or inlet bushing 23. Another foraminous electrode 24 is disposed above the electrode 21 and is electrically connected to the container 20 which in turn is connected to a circuit ground. The fluid to be treated enters via an inlet line 26 and is discharged into the container 20 through a nozzle 27 directed upward against a baffle 28. The treated fluid leaves the container through a line 29 and water and other material coalesced by the electric field and separated from the fluid being treated leaves through a line 30.

The switch unit 14 is controlled by a trigger generator unit 32 which in turn is controlled by a delay circuit unit 33 and a pulse circuit unit 34. A current transformer 35 is connected in one of the conductors between the line terminals 11, 12 and the load, comprising the transformer 15 and treater 10, to provide an input signal to the delay circuit 33 which varies as a function of the load current.

The trigger generator unit 32, the delay circuit unit 33 and the pulse circuit unit 34 comprises a control circuit for actuating the switch unit to connect the source to the load. This is an AC system and the switches comprising the switch unit 14 are designed to open the connection or become nonconducting at the zero crossing time of each half cycle of the source. Typically, this may be accomplished by utilizing polarized rectifiers, such as the now widely used solid state silicon controlled rectifiers. The trigger generator unit 32 provides a triggering pulse for closing a switch or intiating conduction in a rectifier at a particular time following the zero crossing time. The delay circuit 33 provides for control of the time of triggering. The time of triggering or the delay in triggering after zero crossing may be manually varied to provide various conduction times as desired for a particular load. The delay in triggering may also be varied automatically as a function of the load current by using the load current signal from the transformer 35. For example, the control circuit may be set to operate with no delay or with a predetermined delay until the load current exceeds a predetermined value, after which the delay is increased in order to maintain the current at or below the limit. With this arrangement, the delay may be increased to the full 180° thereby shutting off the power to the load entirely.

The pulse circuit unit 34 provides for blocking operation of the trigger generator unit 32 so that no triggering pulses are provided for the switches under certain conditions. More particularly, the pulse circuit unit may permit operation of the trigger generator unit for a predetermined number of cycles of the AC source and then block the triggering for a predetermined number of cycles providing what may be referred to as "pulsing" or "burst" application of power to the load. Means may be provided for varying the "on" time and the "off" time for the pulse circuit unit, as desired. The pulse circuit unit may be operated separately or in conjunction with the delay circuit unit so that each pulse of a burst is a full half wave or a delayed portion, as determined by the delay circuit unit.

A preferred circuit for the units of FIG. 1 is illustrated in detail in FIG. 2. The switch unit 14 includes silicon controlled rectifiers 40, 41 in a full wave inverse parallel connection with the control elements energized from an output transformer 42 of the trigger generator 32.

The system includes a power supply 43 energized from the AC source and input switch 44 selectively connects various voltage-dropping resistors in series with the power supply permitting operation of the circuit from 115 volt, 230 volt and 460 volt sources. The power supply includes four diodes connected as a full wave rectifier, with Zener diodes connected as voltage regulators for a −7 volt output on line 45, a +20 volt output on line 46, and a +27 volt output on line 47. Resistors 48, 49 are connected between one side of the line and circuit ground and are adjusted to balance the alternate half cycle loading and smooth the DC outputs. The power supply also furnishes a timing signal on line 50 having the wave form $V_2$ with a negative voltage pulse at each zero crossing time of the AC supply. Another timing signal is provided on line 51 having the wave form $V_3$, with the $V_3$ signal changing level at each zero crossing time.

The trigger generator circuit 32 provides the properly timed triggering gate pulses for turning on the SCR's 40, 41. A capacitor 55 is reset to zero voltage at each zero crossing of the AC line. The negative going pulse of $V_2$ on line 50 causes the transistor Q4 to conduct and thereby reset the charge on the capacitor 55 to zero, through blocking diode 56. A bias voltage for the transistor Q4 is developed across the series diode string 54. The capacitor 55 is charged by current from the delay circuit 33 on line 57. The delay circuit 33 provides charging current at a constant magnitude which may be varied as will be described herein below. When the voltage on the capacitor 55 reaches a particular value, the transistor Q5 is fired into conduction, generating the triggering pulse. If the capacitor charging rate is low enough such that the transistor Q5 is not fired within a half cycle, the capacitor will be discharged at the end of the half cycle by the action of the transistor Q4 and there will be no triggering pulse.

The operation of the circuit for a fast charging rate, a medium charging rate and a slow charging rate is illustrated in FIG. 3 where $V_1$ is the voltage charge on the capacitor 55 and $V_4$ is the voltage wave form at the load side of the rectifier switches of the switch unit 14. In the left section of FIG. 3, the charging rate is high and a rectifier is fired into conduction after about a 60° delay. In the middle section of FIG. 3, the charging rate is lower and the rectifier is fired into conduction after about a 120° delay. In the right section of FIG. 3, the charging rate is low and there is no rectifier conductiton. A substantially zero delay can be achieved by utilizing a higher charging rate.

A transistor Q6 is connected in shunt with the capacitor 55 via blocking diode 90. A signal from the pulse circuit 34 on line 58 is connected across a pair of resistors operating as a voltage divider, with the junction point of the resistor pair connected to the base of the transistor Q6. The moving arm of a three-position switch 59 is also connected to the base of transistor Q6. With the switch 59 in the "off" position, the transistor Q6 is conducting and shunts all charging current around the capacitor 55. With the switch 59 in the "on" position, the base of transistor Q6 is connected to the +20 volt line preventing any conduction in the transistor Q6. With the switch arm in the "pulse" position, conduction of the transistor Q6 is controlled by the signal from the pulse circuit on line 58. When the pulse circuit signal goes positive, the transistor Q6 does not conduct and the operation of the trigger generator is controlled by the charging current rate from the delay circuit 33. When the signal from the pulse circuit on line 58 goes negative, the transistor Q6 conducts, shunting charging current around the capacitor 55 and blocking all triggering of the controlled rectifiers.

The pulse circuit 34 includes a bistable flip flop 65 incorporating transistors Q7, Q8. The flip flop is driven via transistor Q9 which is controlled in part by transistor Q10. The transistor Q10 is controlled by the timing signal $V_3$ on line 51 and conducts every other half cycle as the signal $V_3$ drops to zero volts. Transistor Q9 conducts when the voltage across capacitor 66 reaches a potential that, when supplemented by the drop across resistor 67 as transistor Q10 conducts, exceeds the conduction initiating potential of transistor Q9. The drop across resistor 67 as transistor Q9 conducts is coupled to the flip flop transistors causing switching. The transistor Q9 does not conduct every time the transistor Q10 conducts, but the transistor Q9 conducts only when the transistor Q10 conducts so that switching occurs only at the zero crossing time of every other half cycle. With this arrangement, the power in the overall system is shut off, after a plurality of conduction cycles, at a specific zero point in the cycle, leaving the power transformer substantially unbiased or in a neutral or substantially zero flux state. This permits turning "on" of power at a later time without adversely affecting the transformer. For example, if power is shut "off" leaving the transformer core highly biased in a positive state and power is turned "on" during a positive going portion of a cycle, the core can be driven beyond saturation with resulting excessive and detructive charging current.

The capacitor 66 is charging through resistor 68 or resistor 69, depending upon which of transistors Q8, Q7 conducting. Transistor Q6 of the trigger generator conducts when transistor Q7 of the flip flop 65 conducts. Thus, the "on"and "off" times may be controlled by varying the settings of the resistors 68, 69. "On" time denotes the number of cycles of the AC source power is connected to the load during a pulsing or burst operation, and "off" time denotes the number of cycles of the AC source between bursts. In a typical operation the "on" time may be in the order of a few cycles to a few seconds and the "off" time may be in the order of a few cycles to a few seconds. The choice of "on" and "off" times will depend upon the characteristics of the fluid being treated, such as conductivity, viscosity, water content, temperature and stability.

The delay circuit 33 provides the charging current for the capacitor 55 of the trigger generator through line 57 and transistor Q2. Variable resistor 76 provides for manual setting of the maximum conduction angle or minimum delay time by putting a top limit on the charging current. Manually adjustable resistor 75 provides for setting the delay time by setting the normal charging current rate. The transistors Q1 and Q3 serve to reduce the magnitude of the charging current or the charging rate by in effect, bypassing some of the charging current around the capacitor 55. Transistor Q1 conducts only during the negative half cycle of the AC source, due to the bias drive on the transistor Q12 from one side of the line via conductor 77. Variable resistor 78 permits adjustment of the amount of correction for the unbalance detected in the alternate half cycle load currents by the capacitors 79, 80. If the alternate half cycle load currents are equal, then the collector of transistor Q12 at the junction of resistors 81, 82 is at zero volts and no correction will be made by the transistor Q1 in the charging current during a half cycle. If the alternate half cycle load currents are not equal, a voltage will be developed at the collector of transistor Q12 and the current in transistor Q1 will change, thereby changing the turn-on time in the negative half cycle, i.e., the time $t_2$ in the $V_4$ curves of FIG. 3 will be varied slightly relative to the time $t_1$.

The delay circuit 33 also includes means for reducing the charging current, i.e., increasing the delay, as a function of an external signal, here a load current signal provided by the current transformer 35. The load current signal varies as a function of the load current and is developed across resistors 85, 86. Resistor 85 is adjustable to set the ratio of load current signal to load current. Transistors Q3 and Q11 are connected in series for reducing the charging current on the line 57 as a function of the load current signal. Variable resistor 87 in the base circuit of the transistor Q3 determines the load current signal level at which Q3 starts to conduct and thereby determines the load current at which the triggering delay is increased. Variable resistor 88 connected between the transistors Q3, Q11 determines the rate of change of delay with increase in load current signal by varying the rate at which the delay increases as the load current signal increases.

In the normal usage of the system, the switch 59 is set in the pulse position, the resistors 68, 69 are adjusted to provide the desired number of "on" cycles and the desired number of "off" cycles for the pulsing operation, the resistor 75 is set to provide the desired delay in the initiation of conduction in each half cycle, and the resistors 85, 87 and 88 are set to provide for increase in delay and decrease in conduction angle, when a particular magnitude of load current is exceeded. The minimum delay resistor 76 and the balance resistor 78 are also set to desired values.

If conduction is desired during every cycle, the switch 59 may be moved to the "on" position, shunting the blocking signal from the pulse circuit and eliminating the pulsing or burst mode. In another alternative arrangement, the resistors 75, 76 can be set to provide substantially zero delay and, with the switch 59 in the pulse position, the system will be operating in the pulsing mode only. The delay increase as a function of load current, or the overcurrent protection arrangement, can be utilized when operating in the pulsing mode only or when operating in the delay mode only or when operating in both modes, by appropriate settings of the resistors 85, 87 and 88.

Although an exemplary embodiment of the invention has been disclosed and discussed, it will be understood that other applications of the invention are possible and that the embodiment disclosed may be subjected to various changes, modifications and substitutions without necessarily departing from the spirit of the invention. While the specific circuit details illustrated and described presently comprise the preferred form of the control circuit, it will be recognized that other arrangements of circuirty can be produced to achieve substantially the same results and such are intended to be covered by this application.

I claim as my invention:

1. In a power control system for an electric emulsion treater or the like, the combination of:
- a pair of AC power source terminals;
- a pair of load terminals;
- switch means for connecting said source terminals to said load terminals comprising controlled rectifiers in a full wave inverse parallel connection and having control elements for switching into conduction; and
- a control circuit for actuating said switch means to close the connection on a half cycle of the A.C. source in which the current is of a polarity opposite to that of the current in the last preceding half cycle in which conduction occurred, and maintain the connection for a predetermined number of cycles of the AC source, and to open the connection at a zero crossing time of a subsequent half cycle of the A.C. source and maintain the open connection for a predetermined number of cycles, and including a trigger generator circuit for cyclically generating triggering pulses for said rectifier control elements.

2. A system as defined in claim 1 in which said control system includes timing means operating in synchronism with the AC source for limiting actuation of said switch means to the zero crossing times of the AC source.

3. A system as defined in claim 1 in which said control circuit includes a pulse circuit connected to said trigger generator circuit for blocking triggering pulses for a first number of cycles and not blocking triggering pulses for a second number of cycles.

4. A system as defined in claim 3 in which said pulse circuit includes a bistable flip flop circuit and a switching circuit having first and second variable timing elements for determining the set and reset periods of the flip flop circuit, and a timing circuit operating in synchronism with the AC source for limiting actuation of the flip flop circuit to every other zero crossing time of the AC source.

5. A system as defined in claim 4 in which said timing circuit includes:
- a first transistor;
- first means for switching said first transistor every other half cycle of the A.C. source;
- a second transistor;
- second means coupling said first transistor to said second transistor and including a storage capacitance charged through said switching circuit timing elements, for switching said second transistor only when said first transistor switches; and
- third means coupling said second transistor to said flip flop circuit for actuating said flip flop circuit, with said flip flop circuit providing the output of the pulse circuit.

6. A system as defined in claim 1 in which said switch means opens the connection at each zero crossing time of the AC source, and
- in which said control circuit includes means for delaying reclosing of the connection each half cycle for a predetermined portion of the half cycle.

7. A system as defined in claim 6 including means for varying said predetermined portion of the half cycle as a function of the current between said line and load terminals.

8. A system as defined in claim 3 in which a rectifier becomes nonconducting at the zero crossing time of the AC source, and
- in which said control circuit includes a delay circuit connected to said trigger generator circuit for controlling the time between zero crossing and the generation of the next triggering pulse.

9. A system as defined in claim 8 in which said trigger generator circuit includes a capacitance and a pulsing circuit responsive to a particular voltage across said capacitance for producing a triggering pulse, and
- said delay circuit includes means for charging said capacitance at a controlled rate with the time required to charge said capacitance and actuate said pulsing circuit corresponding to the delay between zero crossing and rectifier triggerings, and with said pulse circuit providing a signal to said trigger generator circuit to prevent charging of said capacitance for blocking triggering pulses.

10. A system as defined in claim 9 including means for reducing the rate at which said capacitance is charged by said delay circuit when the current between said line and load terminals exceeds a predetermined limit.

11. A system as defined in claim 9 in which said means for charging includes:

a charging current source;

means for varying the magnitude of charging current from said source;

means for bypassing a portion of the charging current around said capacitance; and means for varying the amount of current bypassed as a function of the current between said line and load terminals.

12. A system as defined in claim 9 in which said means for charging includes:

a charging current source;

means for bypassing a portion of the charging current around said capacitance;

sensing means for producing an unbalance signal varying as a function of unbalance between load current in the positive and negative half cycles; and means for varying the amount of current bypassed in one half cycle as a function of said unbalance signal to reduce the load current unbalance.

13. A system as defined in claim 8 in which said control circuit includes:

sensing means for producing an unbalance signal varying as a function of unbalance between load current in the positive and negative half cycles; and variable delay means for varying the time between zero crossing and the generation of the next triggering pulse in one half cycle relative to the time in the other half cycle as a function of said unbalance signal to reduce the load current unbalance.

14. A system as defined in claim 9 including:

second switch means manually actuable to effectively remove said pulse circuit signal from said trigger generator circuit so that said delay circuit fully controls the operation of said rectifiers.

15. In a power control system for an electric emulsion treater or the like, the combination of:

a pair of AC power source terminals;

a pair of load terminals;

switch means for connecting said source terminals to said load terminals and comprising controlled rectifiers in a full wave inverse parallel connection and having control elements for switching into conduction, with a rectifier becoming nonconducting at the zero crossing time of the AC source; and a control circuit for actuating said switch means to close the connection on a half cycle of the AC source in which the current is of a polarity opposite to that of the current in the last preceding half cycle in which conduction occurred, and to open the connection at a zero crossing time of a subsequent half cycle of the AC source, and including a trigger generator circuit for generating triggering pulses for said rectifier control elements, and a delay circuit connected to said trigger generator circuit for controlling the time between zero crossing and the generation of the next triggering pulse, said trigger generator circuit including a capacitance and a pulsing circuit responsive to a particular voltage across said capacitance for producing a triggering pulse, and said delay circuit including means for charging said capacitance at a controlled rate with the time required to charge said capacitance and actuate said pulsing circuit corresponding to the delay between zero crossing and rectifier triggering.

16. A system as defined in claim 15 in which said means for charging includes:

a charging current source;

means for varying the magnitude of charging current from said source;

means for bypassing a portion of the charging current around said capacitance; and means for varying the amount of current bypassed as a function of the average current between said line and load terminals.

17. A system as defined in claim 15 in which said means for charging includes:

a charging current source;

means for bypassing a portion of the charging current around said capacitance;

sensing means for producing an unbalance signal varying as a function of unbalance between load current in the positive and negative half cycles; and means for varying the amount of current bypassed in one half cycle as a function of said unbalance signal to reduce the load current unbalance.

18. In a power control system for an electric emulsion treater or the like, the combination of:

a pair of AC power source terminals;

a pair of load terminals;

switch means for connecting said source terminals to said load terminals, with said switch means opening said connection at each zero crossing time of the AC source; and a control circuit for actuating said switch means to close the connection on a half cycle of the AC source in which the current is of a polarity opposite to that of the current in the last preceding half cycle in which conduction occurred, and maintain the connection for a predetermined number of cycles of the AC source and to open the connection at a zero crossing time of a subsequent half cycle of the AC source and maintain the open connection for a predetermined number of cycles, said control circuit including means for delaying reclosing of the connection each half cycle for a predetermined portion of the half cycle, and means for manually varying said predetermined portion of the half cycle and means for manually varying said predetermined portion of the half cycle and means for varying said predetermined portion of the half cycle as a function of the current between said line and load terminals.

References Cited

UNITED STATES PATENTS

| | | | |
|---|---|---|---|
| 3,319,152 | 5/1967 | Pinckaers. | |
| 3,333,112 | 7/1967 | Vercellotti | 307—275 X |
| 3,335,291 | 8/1967 | Gutzwiller | 307—252 |
| 3,335,360 | 8/1967 | Reinert. | |
| 3,363,143 | 1/1968 | Cavanaugh. | |
| 3,375,403 | 3/1968 | Flieder | 315—240 |

J D MILLER, Primary Examiner

G. GOLDBERG, Assistant Examiner

U.S. Cl. X.R.

307—252, 269; 323—24, 38, 41

UNITED STATES PATENT OFFICE

CERTIFICATE OF CORRECTION

Patent No. 3,535,614 Dated October 20, 1970

Inventor(s) HOMER M. WILSON

It is certified that error appears in the above-identified patent and that said Letters Patent are hereby corrected as shown below:

Column 2: Line 61, "comprises" should read --comprise--.

Column 3: Line 53, "SCR's" should read --SCRs--.

Column 4: Line 55, "detructive" should read --destructive--.

Column 8: (Claim 18), lines 51-52, "and means for manually varying said predetermined portion of the half cycle" should be deleted.

SIGNED AND SEALED
JAN 12 1971

(SEAL)
Attest:

Edward M. Fletcher, Jr.
Attesting Officer

WILLIAM E. SCHUYLER, JR.
Commissioner of Patents